United States Patent
Al-Aqeeli et al.

(10) Patent No.: US 10,428,521 B2
(45) Date of Patent: *Oct. 1, 2019

(54) MASONRY BLOCK HAVING A CAVITY WEB

(71) Applicant: King Fahd University of Petroleum and Minerals, Dhahran (SA)

(72) Inventors: Nasser M. Al-Aqeeli, Dhahran (SA); Homoud M. Assehdi, Dhahran (SA); Mohammad M. Maslehuddin, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/194,566

(22) Filed: Nov. 19, 2018

(65) Prior Publication Data

US 2019/0249430 A1 Aug. 15, 2019

Related U.S. Application Data

(63) Continuation of application No. 15/895,679, filed on Feb. 13, 2018, now Pat. No. 10,161,132.

(51) Int. Cl.
| | | |
|---|---|---|
| *E04C 1/40* | (2006.01) | |
| *C04B 14/32* | (2006.01) | |
| *C04B 2/06* | (2006.01) | |
| *C04B 12/04* | (2006.01) | |
| *C08J 9/00* | (2006.01) | |
| *C04B 16/06* | (2006.01) | |

(52) U.S. Cl.
CPC .......... *E04C 1/40* (2013.01); *C04B 2/06* (2013.01); *C04B 12/04* (2013.01); *C04B 14/321* (2013.01); *C04B 14/323* (2013.01); *C04B 16/0616* (2013.01); *C08J 9/0066* (2013.01); *C08J 2421/00* (2013.01)

(58) Field of Classification Search
CPC ......... C04B 2/06; C04B 12/04; C04B 14/321; C04B 14/323; C04B 16/0616; C08J 9/0066; C08J 2421/00; E04C 1/40
See application file for complete search history.

(56) References Cited

U.S. PATENT DOCUMENTS

| | | |
|---|---|---|
| 5,290,356 A | 3/1994 | Frankowski |
| 5,391,226 A | 2/1995 | Frankowski |
| 5,456,751 A | 10/1995 | Zandi |
| 6,645,290 B1 | 11/2003 | Barbour |
| 8,308,863 B2 | 11/2012 | Glessner, Jr. et al. |
| 9,382,160 B2 | 7/2016 | Al-Aqeeli |
| 9,670,095 B2 | 6/2017 | Al-Aqeeli |
| 9,676,989 B2 | 6/2017 | Brenneis et al. |
| 10,161,132 B1 * | 12/2018 | Maslehuddin ............ E04C 1/40 |
| 2010/0258751 A1 | 10/2010 | Shayer |
| 2011/0245372 A1 | 10/2011 | Huang |
| 2012/0252910 A1 | 10/2012 | Yen |
| 2012/0325476 A1 | 12/2012 | Brenneis |
| 2014/0308077 A1 | 10/2014 | Morbi |
| 2015/0080505 A1 | 3/2015 | Blyth |
| 2017/0226014 A1 | 8/2017 | Al-Aqeeli et al. |

FOREIGN PATENT DOCUMENTS

| | | |
|---|---|---|
| CN | 105541261 A | 5/2016 |
| IN | 201406214 I4 | 1/2016 |
| RU | 2003122253 A | 3/2005 |
| WO | WO 00127774 A1 | 5/2000 |

OTHER PUBLICATIONS

J.N. Eiras, et al., "Physical and mechanical properties of foamed Portland cement composite containing crumb rubber from worn tires", Materials & Design, vol. 59, Jul. 2014, pp. 550-557.

Weerapol Namboonruang, et al., "Properties of Crumb Rubber Mixed in Local Thailand Soil Cement Brick Composites", Advanced Materials Research, vol. 821-822, pp. 1271-1276; https://www.scientific.net/AMR.821-822.1271, [No Date].

* cited by examiner

*Primary Examiner* — Anthony J Green
(74) *Attorney, Agent, or Firm* — Oblon, McClelland, Maier & Neustadt, L.L.P.

(57) ABSTRACT

A cementitious composite and cured masonry block made from the cementitious composite. The cementitious composite contains a cement, a non-rubber aggregate, a crumb rubber and at least one of cement kiln dust and limestone powder. The crumb rubber aggregate is extracted from scrap tires after being processed and then mixed in specified percentages with the aggregate, the cement and water, then cured in forms to make the masonry blocks. In the present disclosure sand, which is used in conventional masonry blocks, is at least partially replaced with crumb rubber to produce a sand-free or sand-reduced masonry block that contains crumb rubber. The crumb rubber masonry blocks satisfy the ASTM non-load bearing requirements. The use of crumb rubber decreases the unit weight and increases thermal resistance of the masonry blocks. The use of cement kiln dust or limestone as a partial replacement of cement will lead to decrease in the cost. The use of industrial waste materials, such as crumb rubber, limestone powder and cement kiln dust, will lead to economic and environmental benefits.

14 Claims, 3 Drawing Sheets

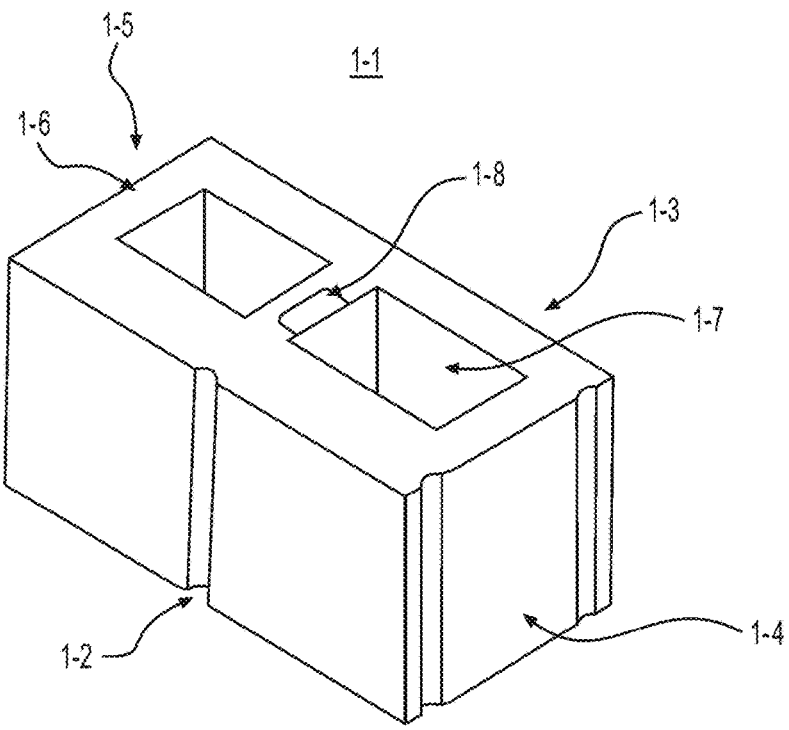
FIG. 3
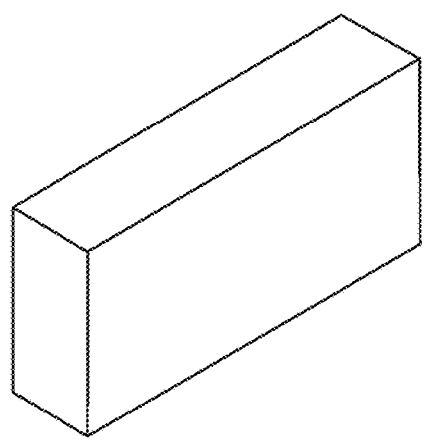 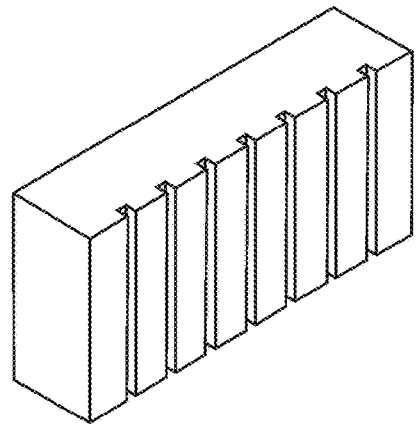
FIG. 4A  FIG. 4B

MASONRY BLOCK HAVING A CAVITY WEB

CROSS-REFERENCE TO RELATED APPLICATIONS

The present application is a Continuation of Ser. No. 15/895,679, now U.S. Pat. No. 10,161,132, having a filing date of Feb. 13, 2018.

BACKGROUND OF THE INVENTION

Technical Field

The present invention relates to composite compositions containing a cement, crumb-rubber particles, one or more aggregates, and at least one of limestone powder and cement kiln dust. The present disclosure further relates to masonry blocks made from the cured composite compositions.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Innovative, environmentally friendly and ready-to-use building composites (e.g., composite compositions) that provide a combination of high efficiency, quality and improved thermal resistance have long been sought. This search has been ongoing in an environment with increased demand on both thermal and mechanical (thermo-mechanical) performance of new building products integrated with various plasters, foils, particles and rubbers.

The demand for new low-cost and efficient building materials has increased together with an increase in population, leading to a chronic shortage of easily accessible (affordable) building materials. Engineers have attempted to address these shortages by utilizing industrial by-products in the formulation and production of useful building materials. Repurposing materials previously viewed as waste addresses problems related to the accumulation of waste materials in areas undergoing rapid population growth. This has become a significant environmental concern, especially in developing countries. Recycling industrial by-products and wastes for use as building materials is a viable solution not only to environmental problems but also it provides a means to substantially lower the construction costs of new buildings and shelters.

The increase in the popularity of using environmentally friendly, low cost and lightweight construction materials in the building industry brings the need for searching more innovative, flexible and versatile composites for a variety of applications. The most important aspects of innovation might be in the development of integrated insulation products, such as the insulated, reinforced concretes, two or three-way precast sandwich wall panels, and rubberized concretes. Part of this interest is to establish the thermal performance of the alternative systems and products. Excellent thermal characteristics are required to guide product development and manufacturing. Methods and data exist for dealing with the common building walls and insulations, but new systems and products are generally lacking such supporting data and expertise.

The public has a physiological barrier to the use of products that are made of crumb rubber (or waste tires). This has hindered the utilization of crumb rubber (CR) in important applications, such as flooring and playgrounds. The present disclosure describes CR-containing construction products and applications that are not in direct contact with people. This will increase the public's acceptance of CR-containing materials.

Scrap tires, which are ordinarily treated as waste, can instead be considered as useful material as a source of CR. CR is a valuable product with ongoing expansion and growth in diversified markets. It is far better to remove tires from the waste stream, regardless of disposal method, than to allow the continued uncontrollable destruction of this resource in fires throughout the world. The materials extracted from scrap tires can be used in the CR supply chain. The CR-containing masonry blocks described herein are able to meet ASTM standards adopted for the utilization of masonry blocks in non-loading applications. Recycling CR has the potential of a tremendous positive environmental impact since scrap tires are conventionally burned due to the lack of otherwise suitable applications.

Cementitious composites containing scrap tire rubber (e.g., an industrial by-product or waste) offer significant advantages in comparison to the conventional cementitious composites. The inclusion of CR in cement-based concrete mixtures may lead to significant benefits, such as lower density, increased toughness and ductility, higher impact resistance, and more efficient heat and sound insulation. The use of recycled tire rubber (e.g., CR) in cementitious products may also help to alleviate disposal problems related to used tires and it also address the growing public concerns regarding the consumption of natural sands and aggregates.

Accordingly, it is one objective of the present disclosure to describe cementitious CR-containing composites for use in construction and for use in the formation of cured masonry products.

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

According to a first aspect, the present disclosure relates to a cementitious composite containing i) a cement, ii) a first aggregate, which is not crumb rubber, iii) crumb rubber and (iv) cement kiln dust or limestone powder.

According to another aspect, the present disclosure relates to a masonry block made from a cured cementitious composite containing i) a cement, ii) a first aggregate, which is not crumb rubber, iii) crumb rubber and (iv) cement kiln dust or limestone powder In one embodiment, the crumb rubber is in the form of coarse particles having a particle size of 1.5-5 mm, fine particles having a particle size of 50-250 µm, or a mixture of the coarse and fine particles.

In one embodiment, the crumb rubber is in the form of coarse particles having a particle size of 2-3 mm.

In one embodiment, the crumb rubber contains fine particles having a particle size of 50-250 µm.

In one embodiment, the fine particles have a particle size of 100-150 µm.

In one embodiment, a ratio of the coarse particles to the fine particles is from 2:1 to 1:2.

In one embodiment the cementitious composite contains cement kiln dust or limestone powder.

In one embodiment, the invention includes a cured composite having a unit weight of 1000-1,250 kg/m.

In one embodiment, the cured composite is in the form of a masonry block having a water absorption of 6.0-9.0% as determined by ASTM C 642.

In one embodiment, an aggregate present in the cementitious composite is a crushed recycled concrete material.

In one embodiment, no aggregate, filler, or additive which comprises a group 13 element is present in the cementitious composite. In one embodiment, the group 13 element is boron.

In one embodiment, the crumb rubber is silanized crumb rubber obtained by treating crumb rubber with a silanizing agent selected from the group consisting of an aminosilane, a glycidoxysilane, and a mercaptosilane. In one embodiment, the aminosilane is selected from the group consisting of (3-aminopropyl)-diethoxy-methylsilane, (3-aminopropyl)-dimethyl-ethoxysilane, and (3-aminopropyl)-trimethoxysilane. In one embodiment, the glycidosilane is (3-glycidoxypropyl)-dimethyl-ethoxysilane. In one embodiment, the mercaptosilane is (3-mercaptopropyl)-trimethoxysilane or (3-mercaptopropyl)-methyl-dimethoxysilane.

In one embodiment, the crumb rubber is carboxylic acid surface modified crumb rubber obtained by treating crumb rubber with hydrogen peroxide.

In one embodiment, the cured cementitious composite has a wt % of crumb rubber ranging from 12 to 18%, relative to the total weight of the cured cementitious composite.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 shows features of a masonry block.

FIG. 4A shows a solid masonry block or brick.

FIG. 4B shows a solid masonry block having a textured and scored surface.

DETAILED DESCRIPTION OF THE EMBODIMENTS

Figure 1:
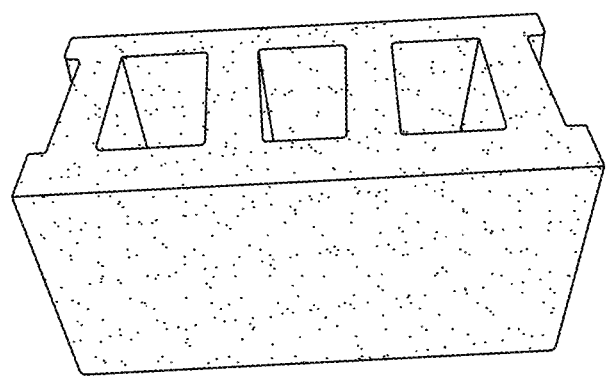
FIG. 1 shows a conventional masonry block.

Embodiments of the present disclosure will now be described more fully hereinafter with reference to the accompanying drawings, in which some, but not all embodiments of the disclosure are shown.

Any type of cement or cement containing material may be used in any of the embodiments disclosed herein. For example, cement may include Type I, Type Ia, Type II, Type IIa, Type III, Type IIIa, Type IV and Type V Portland cements (using either the ASTM CI50 standard or the European EN-197 standard), hydraulic cements, non-hydraulic cements, Portland fly ash cement, Portland pozzolan cement, Portland silica fume cement, masonry cements, mortars, EMC cements, stuccos, plastic cements, expansive cements, white blended cements, pozzolan-lime cements, slag-lime cements, supersulfated cements, calcium aluminate cements, calcium sulfoaluminate cements, geopolymer cements, Rosendale cements, polymer cements, lime mortar, and/or pozzolana mortar.

In one embodiment $SiO_2$ may be present in cement. Cement may include $SiO_2$-containing materials including but not limited to belite ($2CaO.SiO_2$), alite ($3CaO.SiO_2$), celite ($3CaO.Al_2O_3$), or brownmillerite ($4CaO.Al_2O_3.Fe_2O_3$). Sand may be present in an amount of up to 50 wt %, preferably up to 40 wt %, preferably up to 30 wt %, preferably up to 20 wt %, preferably up to 15 wt %, preferably up to 10 wt %, preferably up to 5 wt %, with a minimum amount of 0.5 wt %, preferably 1 wt %.

In one embodiment the masonry blocks are made by mixing cement with crumb rubber in the at least partial absence of sand, with water. The water-containing composition is then cured such that at least a portion of the water is chemically reacted with the cement during curing. In another embodiment the masonry blocks are made with cement-containing sand and that is mixed with crumb rubber. Preferably, a minimum amount of sand, based on the total amount of the sand and the crumb rubber, (or no sand) is present as an aggregate component in the cementitious composite or the cured masonry block.

In the present disclosure, sand is at least partially replaced with crumb rubber, and cement is at least partially replaced with cement kiln dust and/or limestone powder to form a cementitious composite useful for forming masonry blocks comprising cement, a non-rubber aggregate, and at least one of cement kiln dust and limestone powder (which may be in reacted form after curing), and crumb rubber. In one embodiment, the masonry block consists of the cured cement, the non-rubber aggregate, the crumb rubber and at least one of reacted or non-reacted cement kiln dust and limestone powder.

Cement kiln dust (CKD) is a by-product of cement production. Dust is generated during the combustion of gases during the production of cement in a kiln. The heated gases rapidly escape the kiln and carry entrained particulate matter that is typically captured by air pollution control equipment and collected for disposal. CKD is often disposed as a waste. Today, only a relatively small quantity of CKD produced in the world is recycled or utilized in a useful manner.

CKD is a fine dry powder with alkaline characteristics. Ordinarily CKD must be protected from the atmosphere or else it will quickly absorb water and form semi-cured coarse aggregates. CKD can have different particulate characteristics depending on the type of kiln in which it is generated and/or the fuels or other raw materials present during the process for making cement. Cement kiln dust can be obtained from wet or dry kiln processes with differing particle size, composition and pH characteristics.

The CKD present in the cementitious composition of the present disclosure is preferably obtained from a dry kiln process. Particle size characteristics may vary in a range of 0.1-100 μm. Preferably, at least 90 wt %, preferably 90 wt %, 95 wt % or 99 wt % of the CKD in the cementitious composite has a particle size within this range. In a preferred embodiment of the invention the CKD has an average particle diameter of 5-50 μm, preferably 10-35 μm, 15-30 μm or about 10-20 μm. The quantity of CKD particles with a particle diameter of more than 50 μm is preferably no more than 30 wt %, preferably no more than 20 wt %, preferably not more than 10 wt %, preferably not more than 5 wt % based on the total weight of the CKD. Generally the CKD, when dry and immediately after collection, will completely pass through a screen size of 10 mesh or 20 mesh; generally at least 80% of CKD will pass through a screen size of 50 mesh; and at least 70% by weight will pass through a screen size of 200 mesh.

CKD has conventionally been used as a barrier to water transport, such as landfill liners or other applications in which a water/soil barrier is desirable. This property of low hydraulic conductivity may, under some circumstances, be unfavorable for the utilization of CKD as an effective component of a cementitious composition. Low hydraulic conductivity may negatively affect quick dispersion and flow properties of concrete compositions obtained by mixing CKD-containing cement compositions with water prior to curing, for example prior to flowing into a mold to form a formed article, such as a masonry block. In order to improve the hydraulic conductivity and dispersibility, and likewise improve cure time, CKD may be treated chemically prior to inclusion in the cementitious composition of the present claims. In one embodiment the CKD is mixed with glass fibers at elevated temperatures, e.g., temperatures of from 300-1,200° C., preferably a temperature that is at least 100° C., preferably 150 or 250° C. lower than the melting point of the glass fiber with which the CKD is mixed. Mixing CKD with glass fiber at high temperature permits micro-bonding, both chemical and physical, to occur between individual CKD particles and individual glass fibers. Physical connections may arise by simple diffusion or semi-melt contact between a CKD particle and a glass fiber. CKD particles can chemically react with glass fibers when a portion of the silicate structure of the glass fiber diffuses into and/or interacts with the chemical composition of the cement kiln dust whereby the CKD particle exchanges molecular structure positions with portions of the glass fiber. The combined CKD/glass fiber particle provides synergistic advantages such that both improved mixing and dispersion of the CKD particle in a concrete composition is obtained and the benefits of improved strength from glass fibers is also realized. In this manner, the CKD has improved hydraulic conductivity in comparison to the hydraulic conductivity of CKD that is otherwise not reacted with or treated with glass fibers at high temperature. Hydraulic conductivities as great as 5×10.2 cm/sec, preferably ±10%, ±25% or ±50% may be obtained for compacted CKD/glass fiber treated particulate material (where ±means±10%, preferably 5%).

In a still further embodiment of the invention either the CKD or preferably the glass fibers may be contacted with an etching agent such as hydrogen fluoride. The etching agent makes co-substitution of chemical matrices between the CKD and the glass fiber more likely and facile, and thus occurs at lower temperatures. In one embodiment of the invention, a CKD is first contacted with a hydrogen fluoride (HF)-containing composition or HF gas to chemically etch the CKD particles and, for example, form a CKD particle that is deficient in silicon dioxide and preferably forms a CKD that has been enriched with silicon fluorides. Therefore, in a preferable embodiment of the invention the CKD contains fluoride ions (F—) in an amount of from 0.005-0.1 wt %, preferably 0.01-0.05 wt %.

The glass fibers are preferably alkali resistant (AR) glass fibers that may be present in an amount of, for example, 0.5-5% by weight, preferably 1-4% or 2-3% by weight. The glass fibers are typically of small size, smaller than that used in conventional glass fiber reinforced concrete (GFRC). For example, the glass fibers are in the form of individual filaments having a diameter of from 5-50 μm, preferably 10-40 or 20-30 μm. Fiber length may vary from at least 2 times fiber diameter up to 5 mm, preferably up to 4 mm, 3 mm, 2 mm, 1 mm, or 0.5 mm.

The chemical composition of CKD may vary depending upon the conditions of cement manufacture. Nonetheless, the CKD particles used in the cementitious composition of the present disclosure preferably contain a mixture of silicates, calcium oxide, carbonates, potassium oxide, sulfates, chlorides, and metal oxides, such as sodium oxide. Chemical components of CKD are tabulated below.

| Compound | Composition |
|---|---|
| $SiO_2$ | 2.0-20 wt %, preferably 4.0-15 wt %, preferably 6.0-12 wt %, preferably 8-10 wt % |
| $Al_2O_3$ | 0.1-5 wt %, preferably 0.5-4 wt %, preferably 1-3 wt %, preferably about 2.5 wt % |
| $TiO_2$ | 0.01-2 wt %, preferably 0.05-1 wt % |
| $Fe_2O_3$ | 0.1-5 wt %, preferably 0.5-2.5 wt %, preferably 1-1.5 wt % |
| $Mn_2O_3$ | 0.01-0.1 wt %, preferably 0.03-0.01 wt % |
| CaO | 5-60 wt %, preferably 8-55 wt %, preferably 10-50 wt %, preferably 12-45 wt %, preferably 15-40 wt %, preferably 20-30 wt % |
| MgO | 0.1-5 wt %, preferably 0.5-2.5 wt %, preferably 1.0-1.5 wt % |
| $K_2O$ | 0.1-10 wt %, preferably 0.5-8 wt %, preferably 1-5 wt %, preferably 2-4 wt % |
| $Na_2O$ | 0.05-2.5 wt %, preferably 0.1-2 wt %, preferably 0.5-1.5 wt % |

CKD is typically alkaline having a pH measured under leachate testing conditions of 8-13.5, preferably 10-12, preferably about 11. A variety of metal oxides, including transition metal oxides, may be present in minor quantities (for example 1% by weight or less), in the CKD. Iron oxide is preferable component of the CKD and may be present in amounts of greater than 1%, e.g., in an amount of as much as 10 wt %. $Fe_2O_3$ may affect the curing times and resultant compressive strength of the cured cementitious composition. Greater amounts of iron oxide decrease time to gain strength by as much as 30%, as much as 20%, or as much as 10% in comparison to cementitious compositions that contain no iron oxide or an amount of iron oxide that is less than 0.5 wt %.

In a preferred embodiment of the invention, the cementitious composition contains limestone powder (LSP). The limestone powder is preferably obtained as a waste or by-product from quarrying in naturally occurring limestone formations. The limestone powder may be of irregular shape and particle size, such as the limestone powder obtained by cutting naturally occurring limestone with a rock saw. Limestone is a sedimentary rock that is principally composed of the minerals calcite and aragonite. Each of these minerals is a form of calcium carbonate ($CaCO_3$). Calcium carbonate exists naturally in formations throughout the world. It is sometimes used as a component of cement but in the present disclosure the limestone powder content is calculated independently of any limestone aggregate already present in the cement component. It is preferably used without further purification or chemical modification or crushing to form a powder. However, in some embodiments the limestone may be chemically or physically treated in order to modify or enhance its chemical or physical properties. For example, the limestone powder may be heated at temperatures sufficient to at least partially convert the calcium carbonate to calcium oxide and/or calcium hydroxide. The limestone powder may be subject to thermal treatment in the presence of cement and/or a zeolite which may function to exchange calcium for alumina within the mineral structure.

In other embodiments of the invention, the limestone powder is treated physically to alter the particle size of the limestone powder. Limestone powder generated by quarrying operations may be dependent on many factors such as low conditions, e.g., the density and purity of the naturally-occurring limestone deposit, weather conditions during quarrying and the conditions of equipment and the operating parameters under which it is used. The sharpness and/or freshness of a rock saw used to quarry limestone, and the speed at which it is advanced through a limestone deposit, may have dramatic effects upon the particle size of the limestone powder obtained by quarrying using the rock saw. In one embodiment the limestone powder is subject to separate crushing or pulverizing to form a limestone powder of more uniform particle size or particle size distribution. In a still further embodiment the limestone powder may be classified by size prior to its inclusion in the cementitious compositions of the present disclosure. Size classification may be carried out using a series of sieves of gradually tighter mesh size. The limestone powder preferably has an average particle size of from 1 to 50 μm, preferably 2-40 μm, 3-35 μm, 4-30 μm, 5-25 μm, 6-20 μm, 8-18 μm, 10-15 μm or about 12 μm. The specific gravity of the limestone particles generally range from about 2.4 to about 2.8, preferably 2.5-2.6 or about 2.7. In other embodiments of the invention, one or more aggregates present in the cementitious composition may be a limestone aggregate having a substantially greater particle size than the limestone powder. For example, the aggregate may be a crushed limestone having an average particle size of 500 μm or greater, preferably greater than 1 millimeter, preferably greater than 5 millimeter, preferably greater than 10 millimeter or preferably greater than 100 millimeter.

The limestone powder is preferably present in the cementitious composition in a minor amount. For example, the limestone powder may be present in an amount that is less than the total amount of the cement. In some embodiments, the limestone powder is present in an amount that is equal to the amount of cement, preferably no greater than 10% amount greater than the total amount of cement in the cementitious composition. In one embodiment of the invention, limestone powder is in the range of 25 to 50% of the cementitious composition. In another embodiment of the invention, CKD constitutes 35 to 45% of the cementitious composition.

The crumb rubber present in the cementitious powder is preferably present as a mixture of coarse and fine mesh particles. In a preferable embodiment of the invention there are at least three distinct particle types of crumb rubber in the cementitious composition, a first coarse mesh size of 1-5 mm, a second coarse mesh size of 0.5-1 mm and a fine mesh size of 100-200 μm. The first coarse mesh size is preferably 2-4 mm or 2-3 mm and the second coarse mesh size is preferably 0.6-0.9 mm or 0.7-0.8 mm. The fine mesh size is preferably 125-175 μm or about 150 μm. The first and second coarse mesh size crumb rubber particles are present in a weight ratio of 1:1. The total amount of first and second coarse mesh crumb rubber particles are present in a weight ratio with respect to the total weight of the fine coarse mesh crumb rubber particles of 4:1.

Crumb rubber is usually obtained from recycled tires that are ground to about the size of a lump of coal. Thereafter the coal-size particles are ground down to about the size of a walnut, with further grinding techniques bringing the walnut size pieces of rubber down to a lower mesh size. The crumb rubber may be in the form of coarse particles having a particle size of 1.5-5 mm, fine particles having a particle size of 50-250 μm, or a mixture of the coarse particles and the fine particles.

In one embodiment, the crumb rubber is in the form of coarse particles having a particle size of 1.5-5 mm, or 1.6-4.5 mm, or 1.7-4 mm, or 1.8-3.5 mm, or 1.9-3.2 mm, or 2-3 mm.

In one embodiment, the crumb rubber is in the form of fine particles having a particle size of 50-250 μm, or 60-240 μm, or 70-230 μm, or 80-220 μm, or 90-210 μm, or 100-200 μm, or 100-180 μm, or 100-160 μm, or 100-150 μm, or 100-148 m or, 100-140 μm. Preferably, the fine particles of crumb rubber have a mesh size of 65-100 mesh, 70-100 mesh, 75-95 mesh, 80-90 mesh, or an 80 mesh (177 μm) size.

In one embodiment, the cementitious composition contains a mixture of the coarse particles and fine particles. A ratio of the coarse particles to the fine particles (by weight) may range from 2:1 to 1:2, or 1.9:1 to 1:1.9, or 1.8:1 to 1:1.8, or 1.7:1 to 1:1.7, or 1.6:1 to 1:1.6, or 1.5:1 to 1:1.5, or 1.4:1 to 1:1.4, or 1.3:1 to 1:1.3, or 1.2:1 to 1:1.2, or 1.1:1 to 1:1.1, or about 1:1.

In one embodiment, the crumb rubber particles of the present disclosure are treated with a surface treatment agent, such as hydrogen peroxide, to form treated particles having more carboxylic sites than untreated particles. The functional groups in the mixture containing water, aggregate, and cement then interact with the carboxylic sites, thereby causing the treated crumb rubber particles to contact with and be suspended in the mixture to a much greater degree than untreated particles.

Preferably, the crumb rubber particles are as small as possible so that they are most easily suspended in the mixture. The particles can be treated by mixing them with hydrogen peroxide at a temperature of about 65-85° C. while stirring for about 20 to 30 minutes to produce a freely-flowing powder. Preferably, the amount of hydrogen peroxide used is 0.035-0.040 milli-moles of peroxide per gram of mixture.

In another embodiment of the disclosure, the crumb rubber may also be compressed at high pressure in the presence of a specialized urethane, sodium silicate or any other acceptable glues. Preferably, the crumb rubber is compressed at a high pressure in the presence of a sodium silicate. In one embodiment, the applied pressure is stepped until the crumb rubber is flowable by first applying 1600 psi and then in 15 second intervals stepping up the pressure by 500 psi until the pressure reaches to 3600 psi.

In another embodiment, the crumb rubber can be treated with a silanizing agent including but not limited to aminosilanes, glycidoxysilanes, and mercaptosilanes. Such aminosilanes include but are not limited to (3-aminopropyl)-diethoxy-methylsilane, (3-aminopropyl)-dimethyl-ethoxysilane, and (3-aminopropyl)-trimethoxysilane. Such glycidoxysilanes include but are not limited to (3-glycidoxypropyl)-dimethyl-ethoxysilane. Such mercaptosilanes include but are not limited to (3-mercaptopropyl)-trimethoxysilane and (3-mercaptopropyl)-methyl-dimethoxysilane. The organo-functional alkoxysilane group of the silanizing agent interacts with the hydroxyl groups of the crumb rubber to displace the alkoxy groups attached to the silane molecule and a crumb rubber matrix containing the silanized crumb rubber is formed.

In a preferred embodiment of the invention, the organic content of the cementitious composition (e.g., the content of materials that contain carbon to carbon (C—C) bonds) is derived mainly from the crumb rubber. For example, it is preferable that the only organic content is from carbonaceous materials present in the crumb rubber. In other embodiments, the cementitious composition and/or a cured derivative of the cementitious composition may contain organic compounds of which at least 95% by weight, preferably at least 98% by weight, 99% by weight, 99.5% by weight or 99.9% by weight are derived from the crumb rubber where weight percent is based upon the total weight of all of the carbonaceous organic materials present in the cementitious composition and/or cured derivative thereof. Small quantities of additives, such as curing agents or flow modifiers, may be present such that some organic content is present from sources other than the crumb rubber.

Exemplary aggregates include: crushed recycled concrete, gravel, rocks, natural soil, quarried crushed mineral aggregates from igneous, metamorphic or sedimentary rocks, including unused and waste aggregates from quarry operations, gravel, dredged aggregates, china clay stent, china clay wastes, natural stone, recycled bituminous pavements, recycled concrete pavements, reclaimed road base and subbase materials, crushed bricks, construction and demolition wastes, waste/recycled flue gas ashes, crushed glass, slate waste, waste plastics, egg shells, sea shells, and mixtures thereof. In one embodiment, the aggregate is crushed recycled concrete. The crushed recycled concrete can be made by crushing, grinding, pulverizing, etc. any concrete material including concrete compositions that include sand as an aggregate, or more preferably concrete material from the present disclosure (i.e. cement, aggregate which does not include sand, water, crumb rubber).

In one embodiment, no aggregate, filler, or additive which comprises a group 13 element is present in the masonry block. In one embodiment, the group 13 element is boron. Examples of aggregates, fillers, or additives that contain boron include borosilicates, boric acid, boron carbide, boron-containing fibers, boron containing fabrics, boron containing mesh, boron filaments, borax, boron oxide, ferro boron and borated stainless steel, colemanite, ulexite, kemite, tincal, boron nitride, borates, or mixtures or boron isotopes thereof.

The crumb rubber-containing masonry blocks of the present disclosure may contain cement in the range of 5-10 wt %, relative to the total weight of the masonry block. The crumb rubber-containing masonry blocks may include non-rubber aggregate (i.e., which is not crumb rubber) in the range of 75-80 wt % relative to the total weight of the masonry block. The crumb rubber-containing masonry blocks may include water in the range of 5-8 wt % relative to the total weight of the masonry block.

The crumb rubber-containing masonry blocks may include crumb rubber in the range of 5-10% relative to the total weight of the masonry block. Preferably, the crumb rubber-containing masonry block may have a wt % composition that includes 5-10% cement, 75-80% aggregate, 5-8% water; or 5-10% crumb rubber, 5-10% cement, 75-80% aggregate, 5-8% water; or 5-10% crumb rubber, 5-10% cement, 75-80% aggregate, 5-8% water.

In one embodiment, the masonry block has a unit weight of 1000-1250 kg/m$^3$, preferably 1020-1200 kg/m$^3$, preferably 1025-1150 kg/m$^3$. Conventional masonry blocks have a unit weight of around 1259-1260 kg/m$^3$, therefore, the masonry block of the present disclosure may have a unit weight (in kg/m$^3$) that is 10-20% lower than that of conventional concrete blocks, which can cause less weight to be placed on a building frame and less wear on any concrete handling machinery.

In one embodiment, the masonry block has a water absorption of 6.0-9.0%, or 6.5-8.98%, or 6.8-8.95%, or 6.9-8.93% as determined by ASTM C 642.

In one embodiment, the masonry block has a thermal conductivity of 0.3-0.58 W/m·k, preferably 0.34-0.56 W/m·k, preferably 0.36-0.54 W/m·k, preferably 0.4-0.52 W/m·k. Conventional masonry blocks have a thermal conductivity of 0.585 W/m·k, and therefore the masonry blocks of the present disclosure (i.e. containing crumb rubber) have a lower thermal conductivity which may provide energy conservation in buildings employing the crumb rubber masonry blocks.

The masonry block may be of many forms, sizes and structures, such as a stretcher block, a corner block, a pillar block, a jam lock, a partition block, a lintel block, a frogged brick block and a bull nose block. The masonry block may include shapes and structures conventionally known as concrete masonry units (CMU). The masonry block unit includes "split face" masonry block having, at one exposed, a rough surface obtained by splitting a single unit.

Preferably, the masonry block includes one or more chambers that are open on at least a top and bottom of the masonry block. When used for purposes of construction the masonry blocks are laid one atop another in a staggered array to form connected vertical chambers. Such chambers may accommodate one or more reinforcing structures such as reinforcing steel ("rebar"). The vertical chambers may also be filled with one or more insulation materials, such as spray-in foam to reduce the thermal conductivity of the structure that is constructed from the masonry blocks.

The masonry blocks generally have a rectangular structure with top and bottom surfaces representing bonding services onto which a curable adhesive such as a mortar is applied when the masonry blocks are stacked. At least two external face surfaces form the surfaces of walls and/or provide a substrate onto which a further finish such as a paint, plaster or mortar may be applied. Typically, the ends of the masonry block include indentations, protrusions or cavities which permit mating and matching of neighboring blocks during construction. These indentations, protrusions and/or cavities may be present on top surfaces and faces of the masonry blocks to permit end-to-end mating or top-to-bottom mating between neighboring masonry blocks. In larger masonry blocks, a plurality of chambers may be present with each chamber separated from one another by an interconnecting web that connects front and back faces of the masonry block. The web functions to improve the strength of the masonry blocks and improve bonding between blocks when assembled in a stack configuration. In other embodiments the masonry blocks are solid and have no major cavity. In this form the masonry blocks may be used as bricks, papers or other architectural construction units useful for providing a reinforced or strengthened service.

FIG. 3 shows a masonry block (1-1) in the form of a conventional structure block. Front and back exposed faces (1-2) and (1-3) and end faces (1-4) and (1-5) form a face perimeter of the masonry block. A top surface (1-6) is the bonding surface of the vertically stacked masonry block. Cavities (1-7) are present within the masonry block and are separated by a web (1-8). End face (1-4) shows indentations that may match and mate with protrusions of a neighboring masonry block when set in place.

The dimensions of the masonry blocks may vary (FIGS. 5A-5D). A typical structure of a masonry block has a configuration in which the length of the exposed face ranges from 10 cm to 1 m, preferably 20-80 cm, preferably 40-60 cm. When in the shape of a rectangle, the masonry block typically has a thickness that is less than the length, preferably the thickness is 5-80 cm, preferably 10-60 cm, preferably 20-40 cm. The height of the masonry block is typically more similar to the thickness of the masonry block and ranges from 5-80 cm, preferably 10-60 cm, or 20-40 cm. In other embodiments, the masonry block is square in which the thickness of the masonry block is substantially the same as its length. The height may vary in square masonry blocks but may alternately be the same as the thickness or length.

In other embodiments, the masonry block is solid (FIG. 4A). and has no chamber or empty core. FIG. 3 describes a masonry block structure that is solid and has dimensions similar to the dimensions of a masonry block described above. In other embodiments the solid masonry block may have one or more textured or featured surfaces (FIG. 4B).

Figure 5A:
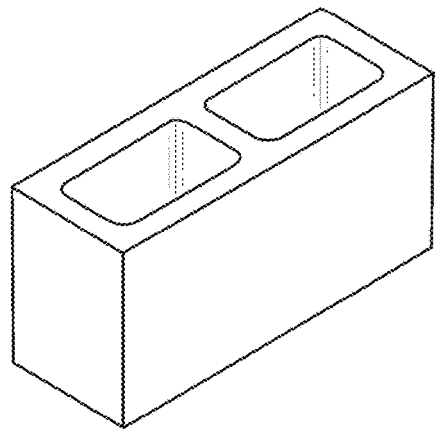
FIG. 5A shows a rectangular masonry block with two cavities.
Figure 5B:
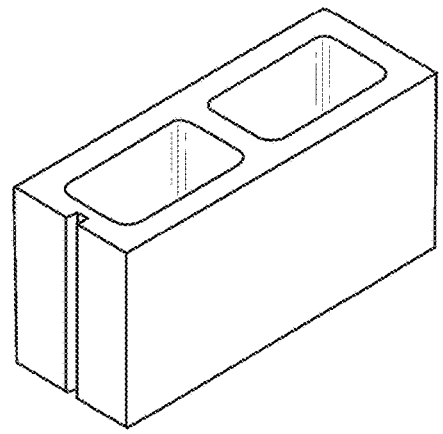
FIG. 5B shows a rectangular masonry block with two cavities and a scored end face.
Figure 5C:
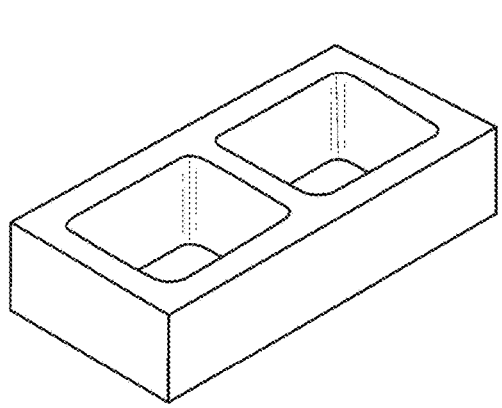
FIG. 5C shows a low height rectangular masonry block with two cavities.
Figure 5D:
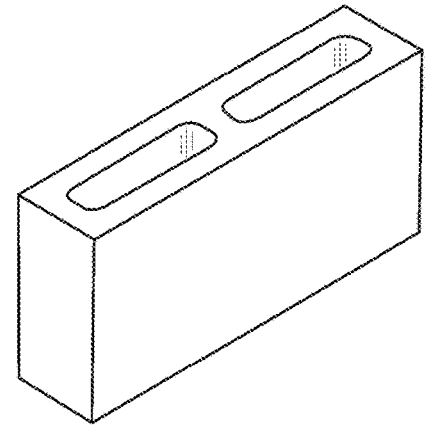
FIG. 5D shows a narrow rectangular masonry block.

FIG. 5A shows the masonry block with two chambers and a single web. FIG. 5B describes a masonry block that includes one scored end face to permit insertion of a reinforcing bar and/or to mate with a protrusion in the end face of a neighboring masonry block. FIG. 5C describes a masonry block having a relatively low height. FIG. 5D describes a masonry block having a relatively narrow thickness.

In another embodiment of the invention, the crumb rubber is present within the masonry block in one or more sections or portions at a higher content than the average content of the crumb rubber over the entire masonry block. For example, a higher crumb rubber content may be present at or near the faces, edges or within certain domains of the masonry block. Biasing the crumb rubber content at a face of the masonry block that represents the main exposed surface of the masonry block provides a construction material that is effective for sound or impact deadening. The crumb rubber content at a face may be, for example, from 20-50% by weight, preferably 30-40% weight percent with weight % determined by the total weight of the section or portion of the masonry block that contains the crumb rubber. Preferably, such sections are the only portions of the masonry block that contain crumb rubber. A section or portion, e.g., one representing a face of the masonry block, can represent a face depth of the masonry block of 5 mm, 10 mm, 2 cm, 3 cm, 5 cm or 10 cm where such portion represents 5%, 10%, 20%, 30%, 40% or 50% of the total face-to-face thickness of the masonry block. Thus, the face of the masonry block may represent a section or portion that is integral with the masonry block but represents a minor portion of the total volume or total weight of the masonry block. Preferably, only a single face of the masonry block contains a biased amount of crumb rubber. In other embodiments, more than one face or portion of the masonry block contains an increased quantity of the crumb rubber.

In another embodiment of the invention, the crumb rubber is contained in a portion of the masonry block that is located mainly internal to the masonry block with only a small exposure at any face thereof. In this way, a section or layer of the masonry block that contains a relatively higher quantity of crumb rubber than the content of crumb rubber in the masonry brick overall, is buried within the masonry block and crumb rubber is exposed in any face of the masonry block only to the extent that edge portions of the layer may be exposed on a face. Inclusion of the crumb rubber in an internal layer provides advantages relating to the physical properties of the masonry block. Properties, such as thermal mass, thermal conductivity, and impact resistance all may all be improved by the inclusion of a crumb rubber-containing layer or section within the masonry block structure.

Masonry blocks containing crumb rubber-enhanced sections or portions may be made by selectively sequentially pouring different concrete compositions into a masonry block mold. Pouring a crumb rubber-containing concrete as the first and last layer of the masonry block forms a masonry block in which both outside exposed faces have an increased content of crumb rubber in comparison to the overall crumb rubber content of the masonry block. Likewise, pouring a layer of a crumb rubber-containing concrete into the mold as an intermediate layer, forms a masonry block in which the crumb rubber-containing later is located internally or buried within the masonry block structure.

One embodiment includes a masonry block comprising crumb rubber, aggregate, cement, and water. In one embodiment, crumb rubber, cement, and aggregate are placed in a concrete mixer and dry mixed for a time period in the range of 30 seconds-10 minutes, 45 seconds-8 minutes, or 50 seconds-5 minutes. Preferably, the crumb rubber, cement, and aggregate are dry mixed for 1 minute. Mixing the crumb rubber, cement, and aggregate forms a mixture in which the crumb rubber is homogenously dispersed. Following the dry mixing process, water is added to the mixture of crumb rubber, cement, and aggregate. The water is slowly poured into a mixer while the mixer turns the cement, crumb rubber, and aggregate for a time period in the range of 1-10 minutes, 2-8 minutes, or 3-6 minutes. Preferably, the water is mixed into the mixture for a time period of 3 minutes.

The mixture of water, crumb rubber, cement, and aggregate is fed into a steel mold to create a masonry block shape. The fresh mix is compacted in the mold by using a steel rod. After setting into the mold, the mixture is air cured for a time period in the range of 1-10 hours, 2-8 hours, or 4-7 hours. Preferably, the mixture is air cured in the mold for a time period of 6 hours and then removed from the mold, which results in a masonry block. The masonry block is then cured for a time period of 15-30 days in a cure tank filled with lime-saturated water at a temperature in the range of 20-30° C., 21-29° C. or 22-28° C. Preferably, the masonry block sample is cured for a time period of 28 days in a cure tank filled with lime-saturated water at a temperature of 22° C.

In one embodiment, the crumb rubber is a thermoset or thermoplastic polymer in the form of recycled crumb rubber from automotive and truck scrap tires.

In another embodiment, the CR augmented masonry blocks do not require new processing routes as the same route used for producing conventional blocks can be adopted.

In another embodiment, the CR augmented masonry blocks satisfy the standard for utilization in the construction industry.

Masonry blocks may be formed from similar quantities of crumb rubber in combination with significant quantities of limestone powder. For example, the cementitious composition containing 15% crumb rubber by weight and 50% LSP by weight provides a compressive strength of 6.9 MPa meeting ASTM standards for masonry blocks. Excellent compressive strength is obtained even for cementitious compositions containing 15 wt % rubber and 25% LSP with an ideal crumb rubber content of 15-20% and an LSP content of about 25%. Such cementitious compositions are substantially economically advantaged in comparison to conventional rubber-containing cementitious compositions which contain substantially greater amounts of a cement such as Portland cement which must be obtained as a purchased material.

The examples below are intended to further illustrate the masonry blocks, their characterization, and uses thereof, and are not intended to limit the scope of the claims.

EXAMPLES

A comparative analysis was carried out between conventional cementitious composites and corresponding cured composites, and cementitious composites containing CR and corresponding cured composites. The inventive CR-containing cementitious composites are able to form cured composites in the form of CR-containing masonry blocks having a combination of properties that satisfy the ASTM non-load bearing requirements, such as compressive strength in addition to satisfying the water absorption requirements.

Conventional masonry blocks are composed of aggregate, cement, water and sand. In the present disclosure, sand is replaced at least in part (preferably in a major amount) with crumb rubber. The inventive crumb rubber masonry block was evaluated for the performance in conditions similar to the ones faced in the construction industry. The conventional masonry blocks are composed of the following ingredients with the listed percentages as listed in Table 1:

TABLE 1

Percent Composition of Conventional Masonry Blocks

| Ingredient | Composition |
|---|---|
| Cement | 25% |
| Aggregate | 55% |
| Water | 5% |
| Sand | 15% |

FIG. 1 depicts conventional masonry blocks that have an average weight of 20.150 kg. Table 2 describes inventive and comparative cementitious composites in the form of cured masonry blocks.

TABLE 2

Composition of Crumb-Rubber Containing Masonry Blocks

| Mixture composition | 2 15% rubber | 3 20% rubber | 4 25% rubber | 5 15% rubber, 25% LSP | 6 20% rubber, 25% LSP | 7 25% rubber, 25% LSP | 8 15% rubber, 50% LSP | 9 20% rubber, 50% LSP |
|---|---|---|---|---|---|---|---|---|
| Cement (gm) | 215 | 215 | 215 | 154 | 154 | 154 | 102 | 102 |
| LSP (gm) | — | — | — | 51 | 51 | 51 | 102 | 102 |
| CKD (gm) | — | — | — | — | — | — | — | — |
| Water (gm) | 123 | 142 | 142 | 127 | 132 | 136 | 137 | 147 |
| Agg # 4 (gm) | 903 | 882 | 862 | 859 | 838 | 819 | 855 | 835 |
| Agg # 8 (gm) | 270 | 264 | 257 | 256 | 250 | 245 | 255 | 249 |
| Sand (gm) | 665 | 611 | 560 | 632 | 581 | 532 | 629 | 578 |
| Rubber #3 (gm) | 47 | 61 | 75 | 45 | 58 | 71 | 44 | 58 |
| Rubber #2 (gm) | 47 | 61 | 75 | 45 | 58 | 71 | 44 | 58 |
| Rubber #1 (gm) | 23 | 31 | 37 | 22 | 29 | 35 | 22 | 29 |
| SP (ml) | 3 | 3 | 3 | 2 | 2 | 2 | 2 | 2 |
| Unit Weight (kg/m$^3$) | 2100 | 1975 | 2055 | 2074 | 2024 | 1956 | 2071 | 2081 |
| Compressive strength (MPa) | 10.1 | 8.9 | 7.9 | 9.6 | 8.3 | 4.2 | 6.9 | 6 |

| Mixture composition | 10 25% rubber, 50% LSP | 11 15% rubber, 25% CKD | 12 20% rubber, 25% CKD | 13 25% rubber, 25% CKD | 14 15% rubber, 50% CKD | 15 20% rubber, 50% CKD | 16 25% rubber, 50% CKD |
|---|---|---|---|---|---|---|---|
| Cement (gm) | 102 | 154 | 154 | 154 | 102 | 102 | 102 |
| LSP (gm) | 102 | — | — | — | — | — | — |
| CKD (gm) | — | 51 | 51 | 51 | 102 | 102 | 102 |
| Water (gm) | 156 | 137 | 137 | 146 | 147 | 157 | 156 |
| Agg # 4 (gm) | 815 | 857 | 837 | 817 | 851 | 831 | 812 |
| Agg # 8 (gm) | 244 | 256 | 250 | 244 | 254 | 248 | 243 |
| Sand (gm) | 530 | 630 | 579 | 531 | 626 | 576 | 527 |
| Rubber #3 (gm) | 71 | 45 | 58 | 71 | 44 | 58 | 70 |
| Rubber #2 (gm) | 71 | 45 | 58 | 71 | 44 | 58 | 70 |
| Rubber #1 (gm) | 35 | 22 | 29 | 35 | 22 | 29 | 35 |
| SP (ml) | 2 | 2 | 2 | 2 | 2 | 2 | 2 |
| Unit Weight (kg/m$^3$) | 2050 | 2102 | 1992 | 2001 | 2078 | 2011 | 1950 |
| Compressive strength (MPa) | 4.3 | 7.4 | 5.5 | 5.3 | 5.4 | 4.2 | 4.2 |

Figure 2:
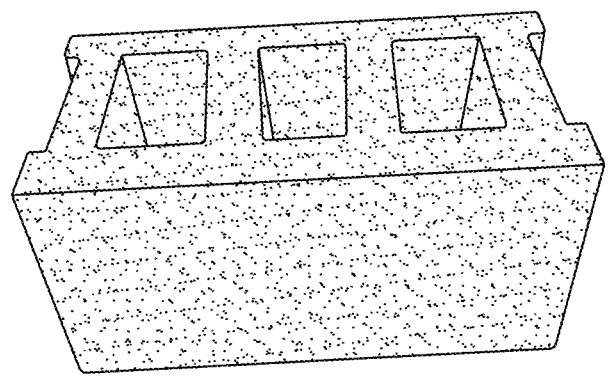
FIG. 2 shows a masonry block made from a cured cementitious composite containing crumb-rubber.

FIG. 2 shows a masonry block fabricated with a CR-containing cementitious composite and which weighs on average 17.6 kg.

The table below describes a family of cementitious compositions cured in the form of masonry blocks and that contain one or more of CKD or limestone powder. Comparative cured cementitious compositions are described in which CKD and/or limestone powder is absent. Each of the cured compositions contains crumb rubber particles. As a baseline, several compositions are described that do not contain limestone powder (LSP) or CKD.

The masonry blocks obtained from curing the cementitious composition in a mold have compressive strengths ranging from 10.1 to 7.9 MPa tested according to ASTM C 39. Masonry blocks formed from cementitious compositions containing 15% crumb rubber and 25% CKD are shown to provide a compressive strength of 7.4. Such masonry blocks which contain significant amounts of industrial by-product or waste are of a special interest to building material.

As is shown by at least Examples 5, 6, 8 and 11, masonry blocks having desirable compressive strength can be formed from cementitious compositions containing significant amounts of industrial by-products and waste, such as crumb rubber, limestone powder and/or cement kiln dust.

It can be seen from the conducted tests that CR-containing masonry blocks meet the requirement ASTM requirements for strength of non-load bearing blocks and exhibited reasonable improvement in thermal characteristics. The addition of different percentages and types of crumb rubber proved to alter the properties of the developed blocks.

The invention claimed is:

1. A masonry block with a cavity web, comprising:
5-10 wt % cement;
75-80 wt % of an aggregate, which is not crumb rubber;
5-8 wt % water;
5-10 wt % crumb rubber relative to the total weight of the masonry block;
wherein the crumb rubber is in the form of coarse particles having a particle size of 1.5-5 mm, fine particles having a particle size of 50-250 μm, or a mixture of the coarse particles and the fine particles; and
at least one of cement kiln dust and limestone powder, wherein the limestone powder has an average particle size of from 1 to 50 μm,
wherein the aggregate is at least one selected from the group consisting of a crushed recycled concrete material and crushed limestone having an average particle size of greater than 1 millimeter, and
wherein the masonry block has a rectangular form with a front face, a back face, a first end face and a second end face forming a face perimeter surrounding a plurality of interior cavities separated by a web.

2. The masonry block of claim 1, wherein the crumb rubber is in the form of coarse particles having a particle size of 1.5-5 mm.

3. The masonry block of claim 1, wherein the crumb rubber is in the form of fine particles having a particle size of 50-250 μm.

4. The masonry block of claim 3, wherein the fine particles have a particle size of 100-148 μm.

5. The masonry block of claim 1, wherein the mixture of the coarse particles and fine particles is present.

6. The masonry block of claim 5, wherein a ratio of the coarse particles to the fine particles ranges from 2:1 to 1:2.

7. The masonry block of claim 6, wherein the ratio of the coarse particles to the fine particles is about 1:1.

8. The masonry block of claim 1, which has a unit weight of 1000-1250 kg/m$^3$.

9. The masonry block of claim 1, wherein the masonry block has a water absorption of 6.0-9.0% as determined by ASTM C 642.

10. The masonry block of claim 1, wherein no aggregate, filler, or additive which comprises a group 13 element is present in the masonry block.

11. The masonry block of claim 10, wherein the group 13 element is boron.

12. The masonry block of claim 1, wherein the crumb rubber is carboxylic acid surface modified crumb rubber obtained by treating crumb rubber with hydrogen peroxide.

13. The masonry block of claim 1, which has a wt % of crumb rubber ranging from 12 to 18%, relative to the total weight of the masonry block.

14. The masonry block of claim 1, which consists of the cement, the aggregate, the water, the crumb rubber, the limestone powder and the cement kiln dust.

* * * * *